M. JOHNSON.
Potato Digger.

No. 103,469.

2 Sheets—Sheet 2.

Patented May 24, 1870.

Witnesses
Villette Anderson
Chas Kayon

Inventor
Moses Johnson
Chipman Hosmer & Co
Attorneys

United States Patent Office.

MOSES JOHNSON, OF THREE RIVERS, MICHIGAN.

Letters Patent No. 103,469, dated May 24, 1870.

IMPROVEMENT IN POTATO-DIGGERS.

The Schedule referred to in these Letters Patent and making part of the same

*To all whom it may concern:*

Be it known that I, MOSES JOHNSON, of Three Rivers, in the county of St. Joseph and State of Michigan, have invented a new and valuable Improvement in Potato-Diggers; and I do hereby declare that the following is a full, clear, and exact description of the construction and operation of the same, reference being had to the annexed drawings making a part of this specification, and to the letters and figures of reference marked thereon.

Figure 1:
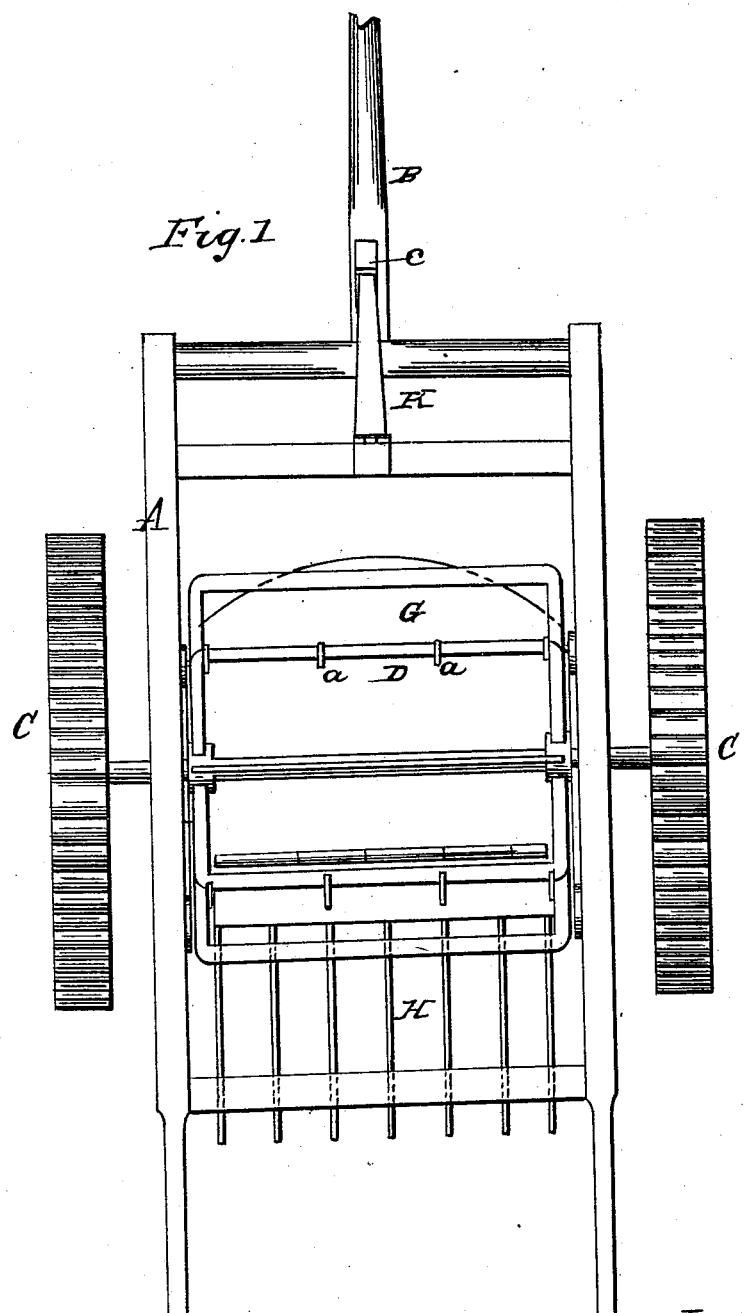

Figure 1 of the drawings is a top view of my invention.

Figure 2:
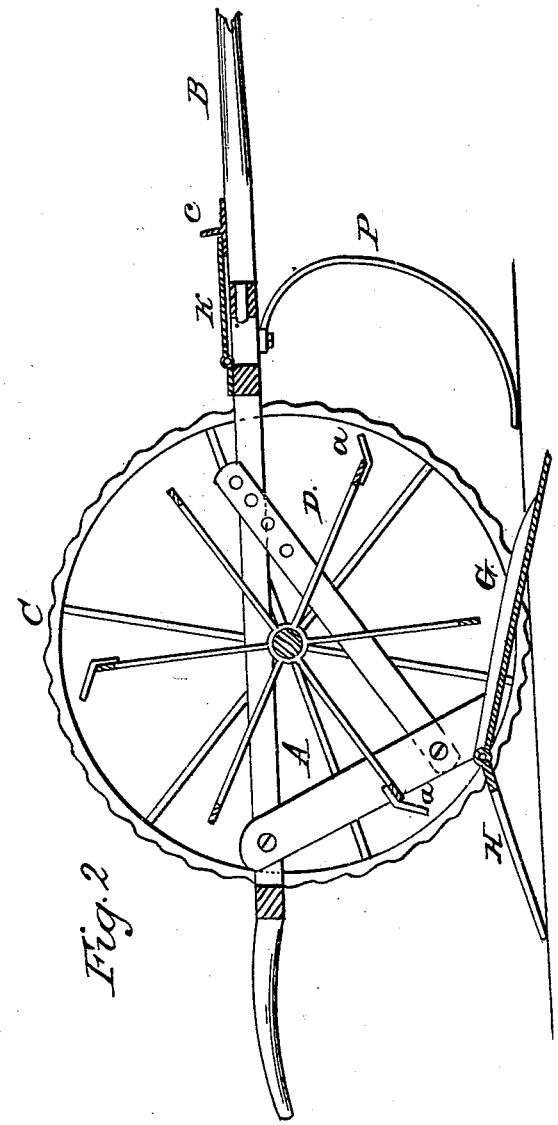

Figure 2 is a central vertical longitudinal section of the same.

My invention relates to that class of agricultural implements intended for use in digging potatoes; and It consists in improvements hereinafter mentioned, which are intended to secure for such implements greater efficiency than has been secured by the devices in ordinary use.

A, of the drawings, represents a quadrangular frame, the rear extensions of which serve as the guiding handles, and to the front end is attached the neap B.

C C represent the wheels of the carriage made fast and rotating with the axle.

The rims of these wheels are corrugated, as shown, the front sides of which corrugations, having abrupt bevels so constructed as to serve as teeth, to pass into the ground, and thereby secure such a purchase as will insure rotation to the wheels and axle as the machine is moved forward.

D represents a reel firmly attached to the axle, upon each alternate horizontal bar of which I attach small teeth marked *a*.

G represents my shovel constructed in the form of a scoop, as shown, and firmly connected to the inner sides of the frame A.

H represents a hinged and toothed apron connected with the rear of the shovel, as shown.

K represents a hinged stop connected by its hinge with the front cross-bar of the frame and adapted to work with the lug *c* upon the tongue of the carriage.

The office of this stop and lug is to enable the operator at will to place the weight of the front end of the machine on the animals' necks, and thereby keep the shovel above the ground while engaged in moving to or from the potato-field.

What I claim as my invention, and desire to secure by Letters Patent, is—

The potato-digger herein described, having frame A, wheels C, with their unequally beveled corrugations, reel D, provided with alternate smooth and toothed horizontal bars, shovel G, apron H, elastic props P, stop K, and lug *c*, when constructed and arranged to operate as specified.

In testimony that I claim the above, I have hereunto subscribed my name, in the presence of two witnesses.

MOSES JOHNSON.

Witnesses:
SAMUEL G. LELAND,
R. R. SEALER.